(12) United States Patent
Chao et al.

(10) Patent No.: US 12,416,764 B2
(45) Date of Patent: Sep. 16, 2025

(54) OPTICAL DEVICE AND ASSOCIATED OPTICAL COLLIMATOR STRUCTURE

(71) Applicant: BROWAVE CORPORATION, Hsinchu County (TW)

(72) Inventors: Feng-Chiang Chao, Taichung (TW); Chang-Yi Peng, Taoyuan (TW)

(73) Assignee: BROWAVE CORPORATION, Hsinchu County (TW)

( * ) Notice: Subject to any disclaimer, the term of this patent is extended or adjusted under 35 U.S.C. 154(b) by 373 days.

(21) Appl. No.: 17/965,114

(22) Filed: Oct. 13, 2022

(65) Prior Publication Data
US 2024/0126018 A1 Apr. 18, 2024

(51) Int. Cl.
*G02B 6/32* (2006.01)
*G02B 6/293* (2006.01)

(52) U.S. Cl.
CPC .............. *G02B 6/32* (2013.01); *G02B 6/2938* (2013.01)

(58) Field of Classification Search
CPC .................................... G02B 6/32; G02B 6/29
See application file for complete search history.

(56) References Cited

U.S. PATENT DOCUMENTS

| | | | | |
|---|---|---|---|---|
| 10,514,507 B1* | 12/2019 | Zhang | ................ | G02B 27/30 |
| 2003/0108292 A1* | 6/2003 | Abe | ................ | G02B 6/2931 |
| | | | | 385/24 |
| 2018/0139520 A1* | 5/2018 | Xiao | ................ | G02B 6/29365 |
| 2021/0041645 A1* | 2/2021 | Li | ................ | H04B 10/506 |

* cited by examiner

*Primary Examiner* — Tina Wong
(74) *Attorney, Agent, or Firm* — MUNCY, GEISSLER, OLDS & LOWE, P.C.

(57) ABSTRACT

The present disclosure provides an optical device including a tray with a step structure, first filters, second filters, and an optical signal router. The step structure has a first portion and a second portion laterally connected to the first portion. The first portion has a first bottom surface and a first top surface. The second portion has a second bottom surface and a second top surface. The first bottom surface and the second bottom surface are substantially coplanar, and the first portion is thinner than the second portion. The first filters are mounted on the first top surface. The second filters are mounted on the second top surface. The optical signal router optically couples to the first filters and the second filters, and is configured to receive a light beam, transmissible to the tray, from one of the first filters or the second filters.

20 Claims, 7 Drawing Sheets

OPTICAL DEVICE AND ASSOCIATED OPTICAL COLLIMATOR STRUCTURE

FIELD

The present disclosure relates to an optical device and associated optical collimator structure, particularly, to a single-sided MUX/DeMUX device and associated optical collimator structure.

BACKGROUND

Wavelength Division Multiplexing (WDM) is a fiber-optic transmission technique that enables the use of multiple light wavelengths (or colors) to send data over the same medium. Dense WDM (DWDM) is defined in terms of frequencies. DWDM's tighter wavelength spacing fits more channels onto a single fiber, but costs more to implement and operate. DWDM is for systems with more than eight active wavelengths (or channels) per fiber. Minimizing device complexity, reducing production cost, and enhance the assembling precision through structural design is critical to DWDM manufacturing.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately," or "about" generally means within a value or range which can be contemplated by people having ordinary skill in the art. Alternatively, the terms "substantially," "approximately," or "about" means within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately," or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

A wavelength division multiplexing (MUX) is a technique utilized to combine a number of optical signals carried by light having different wavelengths into an optical fiber (or other suitable transmission waveguide). Combined light exiting from an optical fiber (or other suitable transmission waveguide) can be decomposed into individual channels having different wavelength bands using a demultiplexing technique (DeMUX). Alternatively stated, a device that multiplexes different wavelength channels or groups of channels into one fiber (or other suitable transmission waveguide) is a multiplexer, and a device that divides the multiplexed channels or groups of channels into individual or subgroups of channels is a demultiplexer. The optical devices implementing such MUX and DeMUX techniques are respectively referred to a multiplexing and demultiplexing module, or simply a multiplexer or a demultiplexer.

Demultiplexer and multiplexer can be utilized in various types of optical devices, optical transmission device or semiconductor structures in order to convey signal in specific ways. However, more channels the multiplexer or demultiplexer are carrying, more densely packed optical fibers, or more collimators carrying such optical fibers, should be assembled on the optical device. In one of the current practices, collimators and optical fibers are placed on both sides of a suitable carrier tray in order to accommodate the large number of the collimators and optical fibers to be assembled. However, the manufacturing complexity and cost for the double-sided structure set forth prevents the wide acceptance of such model. For example, the collimators and optical fibers has to be individually assembled in a sequence corresponding to the optical path, with active calibration and alignment, rendering constant flipping of the carrier tray and laborious calibration process. In another one of the current practices, collimators and optical fibers are stacked in a multi-layer fashion on at least one side of a suitable carrier tray in order to accommodate the large number of the collimators and optical fibers to be assembled. The multi-layer stacking structure is implemented with multiple wedge components so as to support individual collimators and optical fibers, which is often in cylindrical shape and cannot provide a stable placement alone. Given the above, present disclosure provides an optical device and an optical collimator structure that cures the deficiencies of the structures used in current practice.

Figure 1:
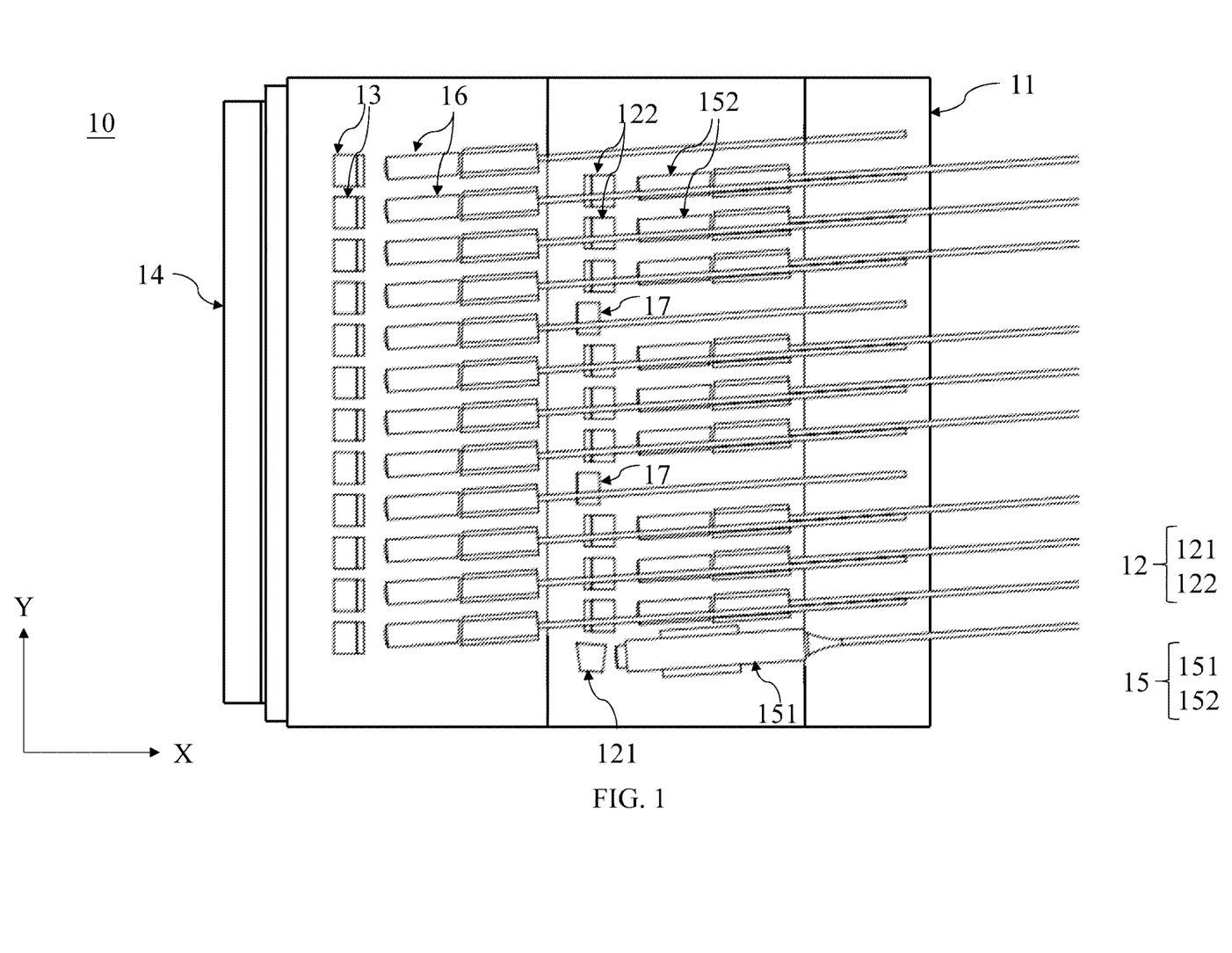
FIG. 1 is a schematic diagram of an optical device from a top view perspective according to some embodiments of the present disclosure.
Figure 2:
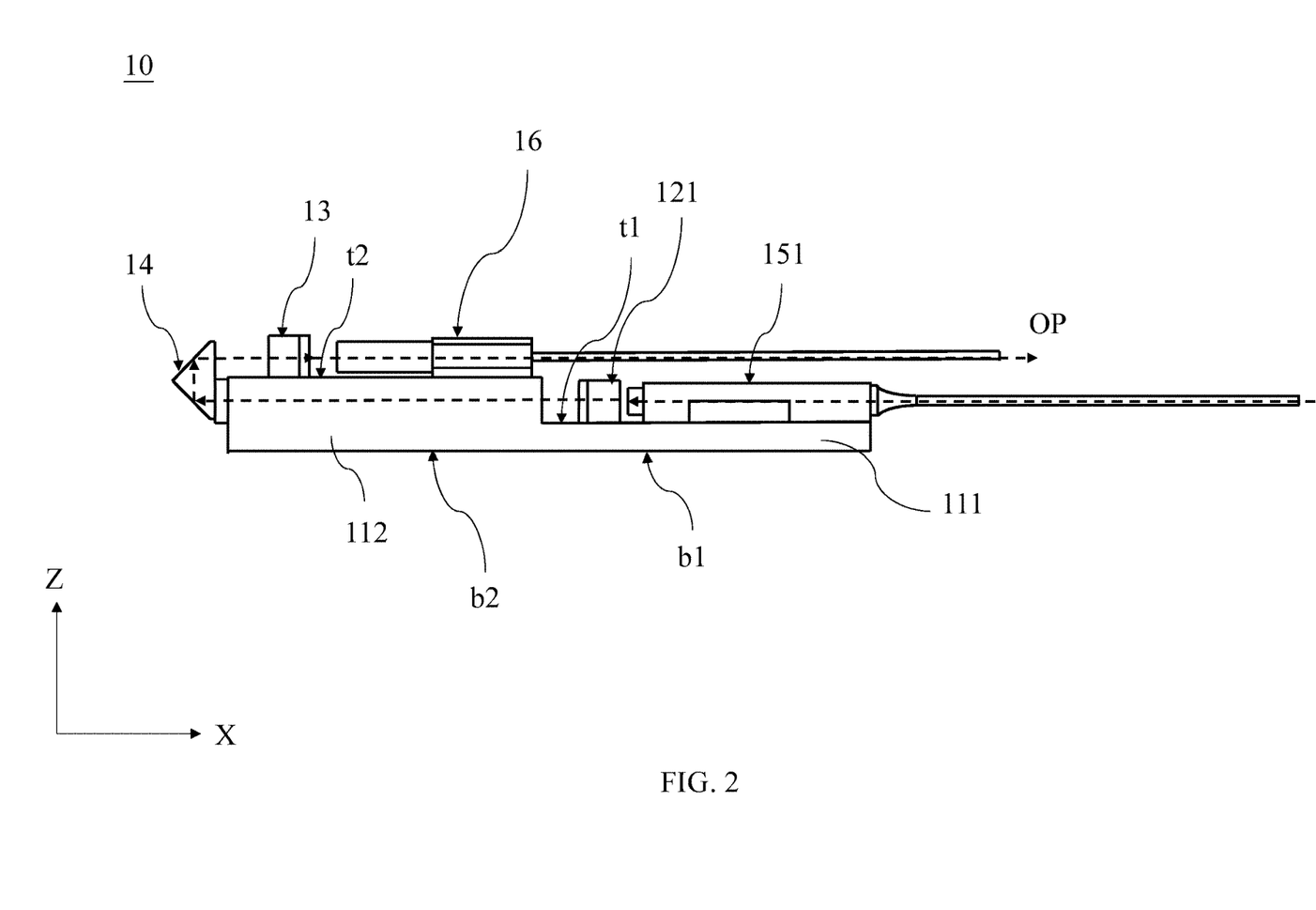
FIG. 2 is a schematic diagram of an optical device from a side view perspective according to some embodiments of the present disclosure.

FIG. 1 and FIG. 2 are schematic diagrams of an optical device 10 from a top view perspective (X-Y plane) and a side view perspective (X-Z plane) according to some embodiments of the present disclosure. The optical device 10 includes a tray 11, first filters 12, second filters 13, an optical signal router 14, first collimators 15, and second collimators 16.

The tray 11 includes one or more step structure having a first portion 111 and a second portion 112 laterally connected to the first portion 111. The first portion 111 has a top surface t1 and a bottom surface b1, and the second portion 112 has a top surface t2 and a bottom surface b2. As illustrated in FIG. 2, the first portion 111 is a thinner portion of the tray 11, and the second portion 112 is a thicker portion of the tray 11. The bottom surface b1 and the bottom surface b2 are substantially coplanar. A thickness of the first portion 111 is less than a thickness of the second portion 112, therefore the top surface t2 is higher than the top surface t1 in the Z-direction. In some embodiments, the entirety of the tray 11 is a continuous substrate. Depending on the number or collimators to be assembled, the number of the step structure can be increased based on various design needs.

Referring to FIG. 1, the first filters 12 and the first collimators 15 are mounted on the top surface t1, and the second filters 13 and the second collimators 16 are mounted on the top surface t2. The optical signal router 14 is coupled to a side surface of the tray 11 proximal to the second portion 112 of the tray 11.

The first collimator 15 includes a common collimator 151 and first channel collimators 152. The optical device 10 can be operated as a multiplexer or a demultiplexer. When the optical device 10 is operated as the multiplexer, the optical device 10 is configured to receive light beams respective from the first channel collimators 152 and the second collimators 16, and further configured to multiplex the light beams for outputting through the common collimator 151.

On the other hand, when the optical device 10 is operated as the demultiplexer, the optical device 10 is configured to receive a light beam from the common collimator 151, and further configured to demultiplex the light beam for outputting through the first channel collimators 152 and the second collimators 16.

The first filters 12 are optically coupled to the respective first collimators 15, and the second filter 13 are optically coupled to the respective second collimators 16. More specifically, the first filters 12 includes a common filter 121 and first channel filters 122; the common filter 121 is optically coupled to the common collimator 151, and the first channel filters 122 are optically coupled to the respective first channel collimators 152.

A pass band of respective first channel filters 122 and the second filters 13 are different from each other, and a pass band of the common filter 121 includes each of the pass bands of the respective first channel filters 122 and the second filters 13. In some embodiments, the common filter 121 is a prism.

The optical signal router 14 optically couples the first filters 12 and the second filters 13, and is configured to receive a light beam, transmissible to the tray 11, form one of the first filter 12 or the second filters 13. In some embodiments, the optical signal router 14 is a right angle prism vertically offsetting the light beam from one of the first filters 12 or the second filters 13.

In FIG. 2, take demultiplexer for an example, an optical path OP is illustrated using dash lines. When a light beam is received by the common collimators 151, the light beam is transmitted through the common filter 121. After transmitting through the common filter 121, the light beam is further transmitted through the second portion 112 of the tray 11 to the optical signal router 14. The tray can be composed of materials which are transparent or transmissible to the wavelength channels that the common collimators 151 carrying. Subsequently, the light beam is guided, for example, through multiple reflections in the optical signal router 14, to vertically elevate its level and continue the path over the top surface t2.

When the light beam reaches the second filter 13, the second filter 13 transmits a portion of the light beam passes through to the corresponding second collimator 16, and the second filter 13 reflects the remainder of light beam toward the optical signal router 14. The remainder of the light beam is guided to one of the first filters 12. The optical path of the remained light beam is again guided, for example, through multiple reflections in the optical signal router 14, to vertically descend its level and enter the second portion 112 of the tray 11, continuing the path over the top surface t1 (not shown in FIG. 2).

Figure 3:
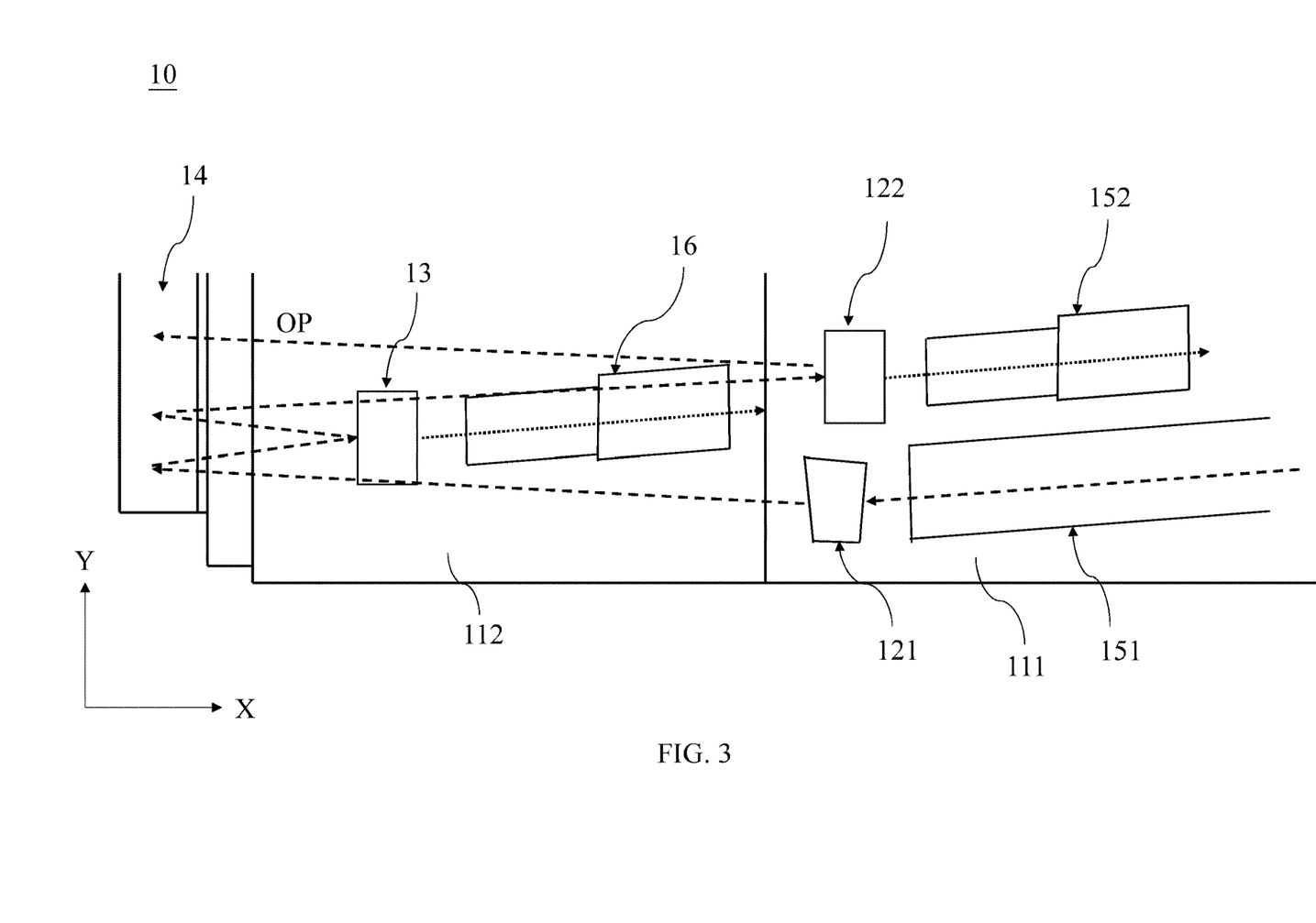
FIG. 3 is a schematic diagram showing an optical path in a portion an optical device from a top view perspective according to some embodiments of the present disclosure.

Referring to FIG. 3. FIG. 3 is a schematic diagram showing an optical path OP in a portion the optical device 10 from a top view perspective. As shown in FIG. 3, after the light beam is received by the common collimator 151, the light beam is vertically elevated to the second filter 13, as previously described in FIG. 2. The second filter 13 then transmits the portion of the light beam passes through (shown by a dotted lines) to the second collimator 16, and the second filter 13 reflects the remainder of the light beam to the optical signal router 14. The optical signal router 14 further vertically descended the remainder of light beam to enter the second portion 112 of the tray 11, and continue on a path that bounds to the first channel filter 122 disposed on the top surface t1 of the tray 11. Similarly, when the light beam reaches the first channel filter 122, the first channel filter 122 transmits a portion of the light beam passes through to the first channel collimator 152, and the first channel filter 122 reflects the remainder of light beam to the optical signal router 14 by transmitting through the second portion 112 of the tray 11. So on and so forth, the optical device 10 serving as a demultiplexer enabled the demultiplexing of multi-channel signals through a compact structure, which assembled the collimators on a single side of the tray 11, and through the at least one step structure on a designated side of the tray 11, the large number of collimators can be accommodated in said single-sided tray 11. As previously discussed, assembling collimators or optical fibers all on one side of the tray streamlines the manufacturing process and reduce production cost by enabling passive assembling and without continuous flipping of the tray.

It should be appreciated by persons having ordinary skills in the art that when the optical device 10 is operated as multiplexer, the light beam is transmitted in a reversed direction of the optical path OP shown in FIG. 2 and FIG. 3.

Figure 4:
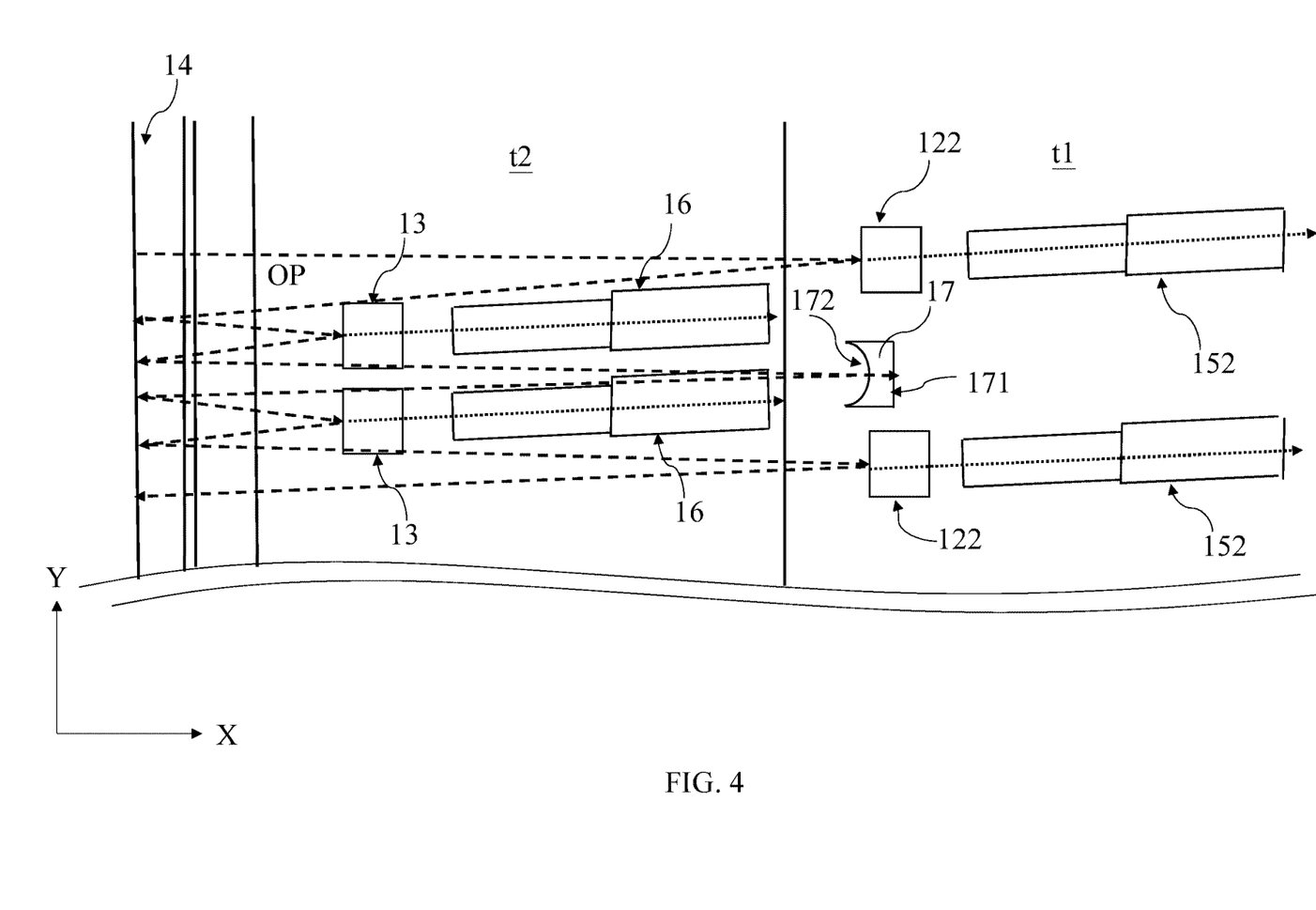
FIG. 4 is a schematic diagram showing a portion of an optical device with a beam shape modifier according to some embodiments of the present disclosure.
Figure 5:
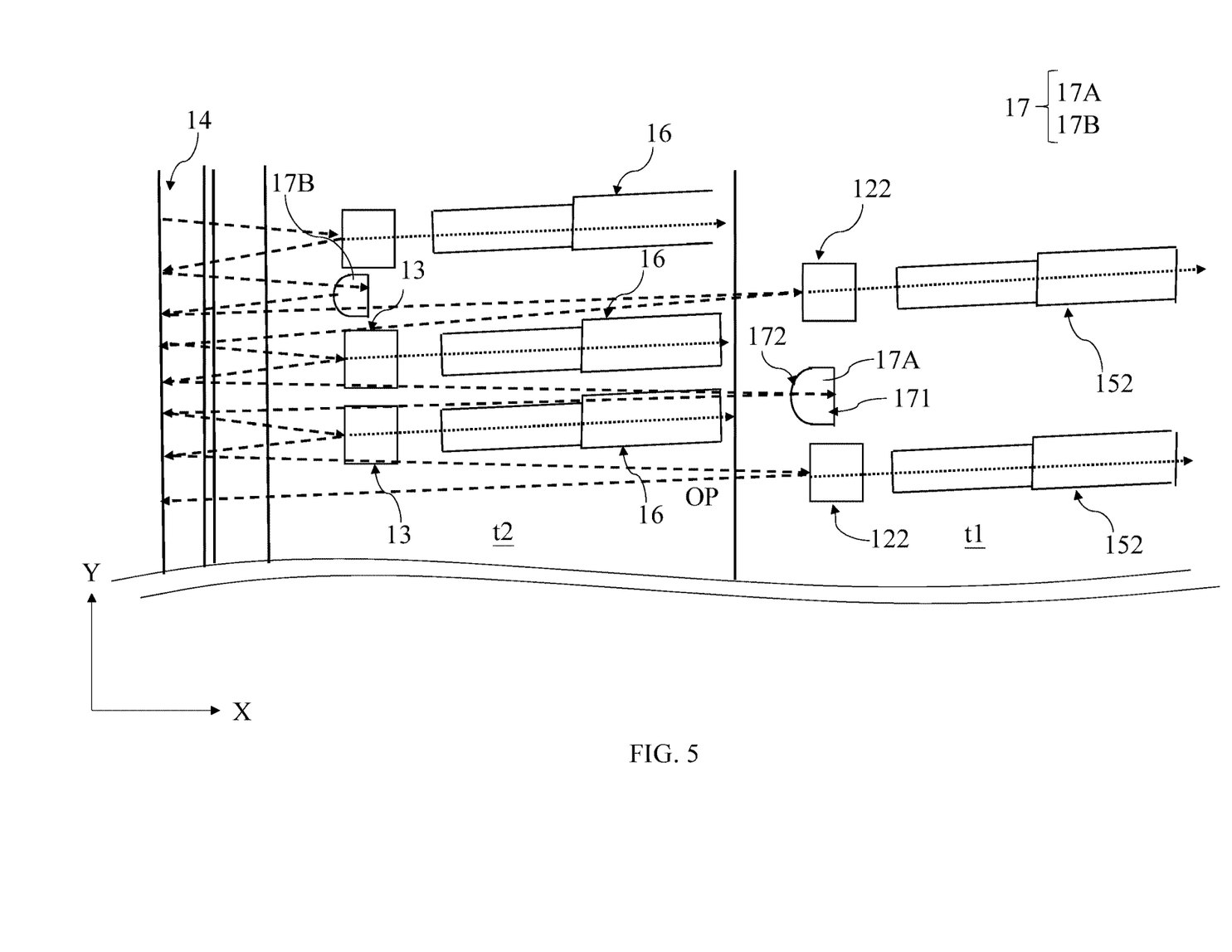
FIG. 5 is a schematic diagram showing a portion of an optical device with a beam shape modifier according to other embodiments of the present disclosure.

Referring to FIG. 4 and FIG. 5. FIG. 4 and FIG. 5 are schematic diagrams showing a portion of the optical device 10 with the beam shape modifier 17 according to some embodiments of the present disclosure. In some embodiments, the beam shape modifier 17 is disposed on the top surface t1 and between two of the first channel filters 122. The beam shape modifier 17 is configured to receive the light beam from one of the second filters 13 through the vertical descending enabled by the optical signal router 14 and transmission through the second portion 112 of the tray 11, and reflect the light beam to another one of the second filters 13 along a reverse path and continue the multiplexing or demultiplexing process.

The beam shape modifier 17 is devised to correct beam shape after a predetermined length of propagation. When a light beam transmitted over a predetermined length of propagation in the optical device 10, the light beam generates unwanted divergence and/or tilting error due to non-ideal factors of the optical components along the path, e.g., filters, optical signal router 14, and the like. For example, one beam shape modifier 17 is devised after the light beam propagates through 7 collimators on the top surfaces t1 and t2, respectively. The number of collimators that the light beam propagates through can be determined by specific conditions and can be a design factor that optimizes the beam shape correction effect.

In some embodiments, the beam shape modifier 17 includes a microlens having a flat surface 171 on one side and a curved surface 172 on the opposing side. The microlens with a flat surface 171 feature can utilize semiconductor manufacturing facilities and the matured photolithography operations to achieve. The microlens produced by semiconductor photolithography operations can be miniatured in size and well controlled in the curvature of the curved surface 172.

Referring to FIG. 4, in some embodiments, the curved surface 172 of the beam shape modifier 17 includes a concave surface, where a distance between the reflection point on the curved surface 172 and the flat surface 171 is smaller than a maximum thickness of the beam shape modifier 17. The light beam enters the beam shape modifier 17 from the concave surface, reflected by the flat surface 171, and exits the beam shape modifier 17 from the concave surface. The two passages of the light beam at the concave surface provide an equivalent optical effect as a concave lens, where both sides of the lens are having a concave profile. In some embodiments, the flat surface 171 can be coated with a high-reflective layer to enhance the reflectivity. As shown in FIG. 4, in some embodiments, the beam shape modifier 17 is disposed only on the top surface t1 at the first portion 111 of the tray 11, between adjacent first channel collimators 152 along Y direction, and one beam shape modifier 17 is disposed after the light beam propagates through N collimators 15 and 16, where N can be any suitable integers. For example, N can be 5, 6, 7, 8, or 9.

Referring to FIG. 5, in some embodiments, the curved surface 172 of the beam shape modifier 17 includes a convex surface, where a distance between the reflection point on the curved surface 172 and the flat surface 171 is greater than a minimum thickness of the beam shape modifier 17. The light beam enters the beam shape modifier 17 from the convex surface, reflected by the flat surface 171, and exits the beam shape modifier 17 from the convex surface. The two passages of the light beam at the convex surface provide an equivalent optical effect as a convex lens, where both sides of the lens are having a convex profile. In some embodiments, the flat surface 171 can be coated with a high-reflective layer to enhance the reflectivity. As shown in FIG. 5, in some embodiments, the beam shape modifier 17A is disposed on the top surface t1 at the first portion 111 of the tray 11, and the beam shape modifier 17B is disposed on the top surface t2 at the second portion 112 of the tray 111. The beam shape modifier 17A can be disposed between adjacent first channel collimators 152 along Y direction, and the beam shape modifier 17B can be disposed between adjacent second channel collimators 16 along Y direction. For the purpose of demonstration, light beam exits the beam shape modifier 17B, propagating through collimator 16 on the top surface t2 and the collimator 152 on the top surface t1, and enters the beam shape modifier 17A. However, generally speaking, the light beam should exit one beam shape modifier, propagate through N collimators, where N can be any suitable integers. For example, N can be 5, 6, 7, 8, or 9, and then enter the next beam shape modifier.

Referring back to FIG. 1, the optical fibers of the first collimators 15 and the second collimators 16 extend along a same direction, i.e., extending away from the optical signal router 14. Specifically, some of the optical fibers of the second collimators 16 extend directly over the first filters 12 and the beam shape modifiers 17 on the top surface t1 of the tray 11.

Figure 6:
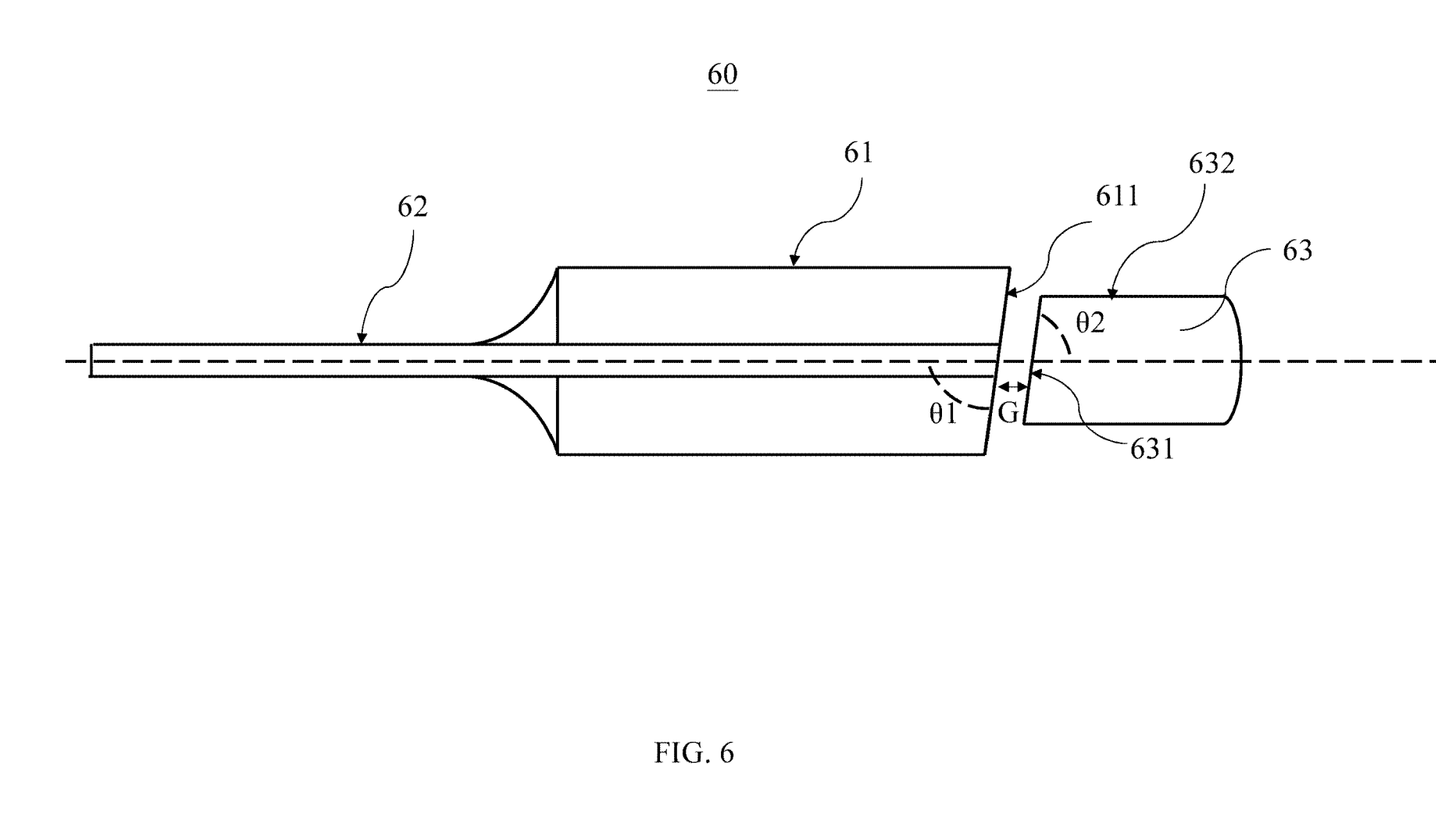
FIG. 6 is a schematic diagram of an optical collimator structure from a side view perspective according to some embodiments of the present disclosure.

Referring to FIG. 6. FIG. 6 is a schematic diagram of an optical collimator structure 70 from a side view perspective according to some embodiments of the present disclosure. The optical collimator structure 60 can represent any one of the first collimators 15 and the second collimators 16 previously discussed.

The optical collimator structure 60 includes a ferrule 61, an optical fiber 62, and a lens portion 63. The ferrule 61 coaxially surrounds and contacts the optical fiber 62. The lens portion 63 is aligned and optically coupled to the optical fiber 62. A terminal of the optical fiber 62 and a terminal of the ferrule 61 form a planar surface 611 facing a terminal surface 631 of the lens portion 63. The ferrule 61 and the lens portion 63 can be fixed or connected through epoxy-containing material or a spacer proximal to the circumferences of the terminal surface 631 of the lens portion 63.

In some embodiments, the optical collimator structure 60 includes a gap G of free air between the planar surface 611 and the terminal surface 631. In other embodiments, the optical collimator structure 60 includes a gap G between the planar surface 611 and the terminal surface 631, which is filled by epoxy containing materials.

In some embodiments, an angle θ1 between the planar surface 611 and an axial direction of the optical fiber 62 is less than 90 degrees. In some embodiments, the planar surface 611 is substantially parallel to the terminal surface 631. Therefore, an angle θ2 between the terminal surface 631 and an axial direction of the optical fiber 62 is substantially equal to the angle θ1. In some embodiments, the angle θ1 about 82 degrees.

As illustrated in FIG. 6, an entirety of the lens portion 63 is outside of the ferrule 61. In other words, the ferrule 61 does not surround any portion of the cylindrical surface 632 of the lens portion 63. Because the lens portion 63 is a free standing component and independent from the ferrule 61, the lens portion 63 is flexible to be rotated or shifted in respect to the ferrule 61 in order to obtain a Pointing Angle less than 0.05 degree. Aligning and adjusting each of the collimator structures on a DWDM to obtain substantially identical Pointing Angles, i.e., all the Pointing Angles are on a same surface in the free space and tilting toward a same direction, is one of the important aspects in terms of the characters and performance of the DWDM.

Figure 7A:
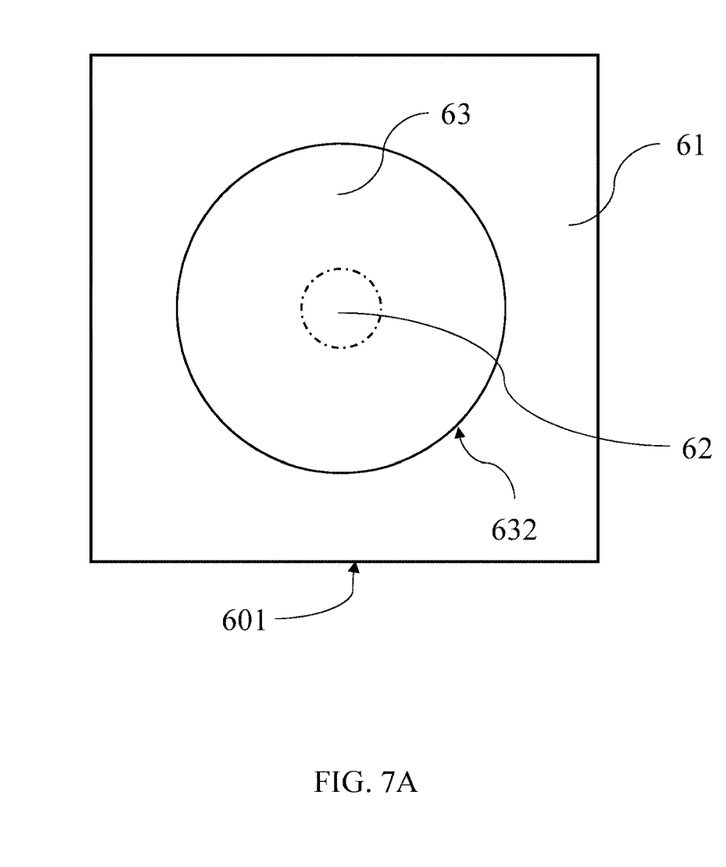
FIG. 7A is a schematic diagram of an optical collimator structure from a perspective traversing a longitudinal direction thereof according to some embodiments of the present disclosure.
Figure 7B:
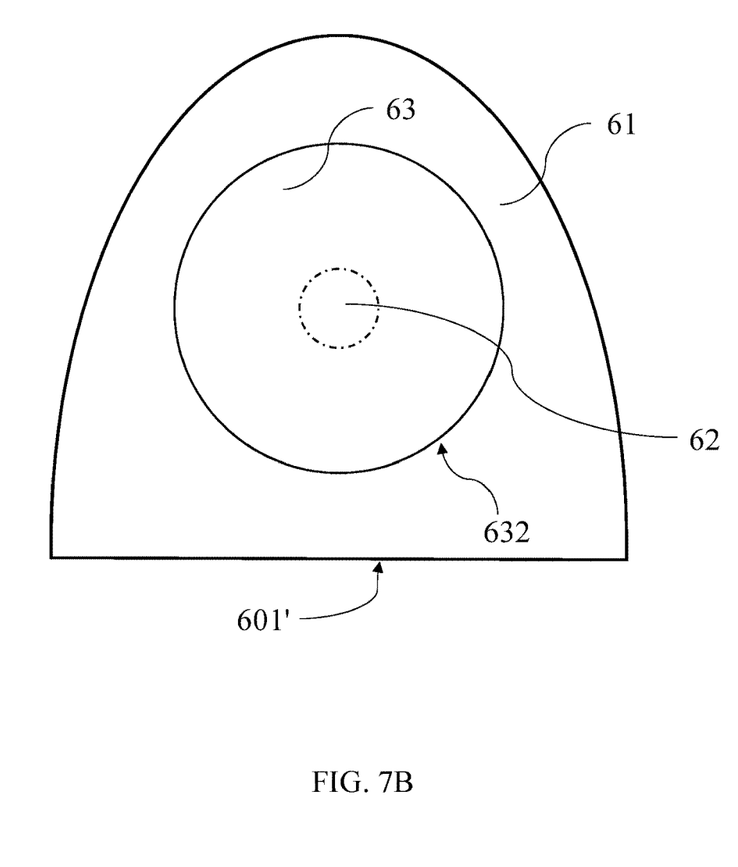
FIG. 7B is a schematic diagram of an optical collimator structure from a perspective traversing a longitudinal direction thereof according to other embodiments of the present disclosure.

Referring to FIG. 7A and FIG. 7B. FIG. 7A and FIG. 7B are schematic diagrams of the optical collimator structure 60 from a perspective traversing a longitudinal direction of the optical fiber 62 (hereinafter the "cross sectional perspective") according to some embodiments of the present disclosure. In some embodiments, the optical collimator structure 60 has a square contour from the cross sectional perspective, as illustrated in FIG. 7A. In other embodiments, the optical collimator structure 60 has a contour including a flat bottom connecting to a curved surface from the cross sectional perspective, as illustrated in FIG. 7B.

In FIG. 7A and FIG. 7B, the ferrule 61 has a flat bottom surface 601 (601') configured to be disposed on or in contact with the tray 11 (not shown). When the optical collimator structure 60 is used as the first collimators 15 described previously, the flat bottom surface 801 (801') is disposed on the top surface t1. When the optical collimator structure 60 is used as the second collimators 16, the flat bottom surface 801 (801') is disposed on the top surface t2. The optical collimator structure 70 and the tray 11 have a planar contact in view of the flat bottom surface 601 (601'), and the optical collimator structure 60 can be assembled on the tray 11 without extra wedge components of supporting members. Compared to conventional collimator structures with a cylindrical ferrule, the optical collimator structure 60 in the present disclosure provides a steady stand when assembling on the tray 11. In addition, compared to conventional collimator structures with an extra case enclosing the ferrule and the lens portion, the optical collimator structure 60 in the present disclosure provides more flexibility in Pointing Angle adjustment during the assembling phase.

Some embodiments of the present disclosure provide an optical device including a tray with a step structure, first filters, second filters, and an optical signal router. The step structure has a first portion and a second portion laterally connected to the first portion. The first portion has a first bottom surface and a first top surface. The second portion has a second bottom surface and a second top surface. The first bottom surface and the second bottom surface are substantially coplanar, and the first portion is thinner than the second portion. The first filters are mounted on the first top surface. The second filters are mounted on the second top surface. The optical signal router optically couples to the first filters and the second filters, and is configured to receive a light beam, transmissible to the tray, from one of the first filters or the second filters.

Some embodiments of the present disclosure provide an optical collimator structure including an optical fiber and a ferrule. The ferrule coaxially surrounds the optical fiber, and is contact with the optical fiber. The ferrule includes a flat bottom surface that enables the optical collimator structure to be disposed on a tray with planar contact.

The foregoing outlines features of several embodiments so that those skilled in the art may better understand the aspects of the present disclosure. Those skilled in the art should appreciate that they may readily use the present disclosure as a basis for designing or modifying other operations and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An optical device, comprising:
a tray with a step structure, the step structure having a first portion and a second portion laterally connected to the first portion, the first portion having a first bottom surface and a first top surface, the second portion having a second bottom surface and a second top surface, the first bottom surface and the second bottom surface being substantially coplanar, and a first thickness of the first portion is less than a second thickness of the second portion;
a plurality of first filters mounted on the first top surface;
a plurality of second filters mounted on the second top surface; and
an optical signal router optically coupling to the first filters and the second filters, the optical signal router being configured to receive a light beam, through the second portion of the tray, from one of the first filters and guide the light beam to one of the second filters, and the optical signal router being further configured to receive the light beam from the one of the second filters and guide the light beam, through the second portion of the tray, to another one of the first filters.

2. The optical device of claim 1, wherein the optical signal router is a right angle prism vertically offsetting the light beam from the first filters or the second filters.

3. The optical device of claim 1, further comprising:
a plurality of first collimators mounted on the first top surface, each optically coupling to the respective first filters; and
a plurality of second collimators mounted on the second top surface, each optically coupling to the respective second filters.

4. The optical device of claim 3, wherein one of the first collimators comprises:
a first optical fiber extending over the first portion of the step structure; and
a first ferrule coaxially surrounding and in contact with the first optical fiber;
wherein the first ferrule having a flat bottom surface disposed on the first top surface.

5. The optical device of claim 4, wherein the first collimator further comprises:
a lens portion aligned and optically coupled to the first optical fiber, wherein a terminal of the first optical fiber and a terminal of the first ferrule form a planar surface facing a terminal surface of the lens portion.

6. The optical device of claim 5, wherein an entirety of the lens portion is outside of the first ferrule.

7. The optical device of claim 4, wherein the first ferrule comprises a square contour from a perspective traversing the first optical fiber.

8. The optical device of claim 3, wherein one of the second collimators comprises:
a second optical fiber extending over the first portion and the second portion of the step structure; and
a second ferrule coaxially surrounding and in contact with the second optical fiber, wherein the second ferrule having a flat bottom surface disposed on the second top surface.

9. The optical device of claim 8, further comprising:
a first beam shape modifier disposed on the first top surface and between two of first filters, the first beam shape modifier being configured to receive the light beam from the one of the second filters and reflect the light beam to another one of the second filters on the second top surface.

10. The optical device of claim 9, wherein the first beam shape modifier comprises a microlens having a flat surface with reflection coating.

11. The optical device of claim 10, wherein the first beam shape modifier further comprises a concave or convex surface opposite to the flat surface.

12. The optical device of claim 9, wherein the second optical fiber extends directly over the first beam shape modifier on the first top surface.

13. The optical device of claim 9, further comprising:
a second beam shape modifier disposed on the second top surface and between two of second filters, the second beam shape modifier being configured to receive the light beam from the one of the first filters and reflect the light beam to the another one of the first filters on the first top surface.

14. The optical device of claim 4, wherein the flat bottom surface enables the one of the first collimators to be disposed on a tray with planar contact.

15. The optical device of claim 5, wherein an angle between the planar surface and an axial direction of the optical fiber is less than 90 degrees.

16. The optical device of claim 5, wherein the terminal surface of the lens portion is parallel to the planar surface of the optical fiber and the ferrule.

17. The optical device of claim 5, wherein the one of the first collimator further comprises a gap between the planar surface and the terminal surface.

18. The optical device of claim 17, wherein the gap is a gap of free air.

19. The optical device of claim 17, wherein the gap is filled with epoxy-containing materials.

20. The optical device of claim 4, wherein the first ferrule comprises a contour including a flat bottom connecting to a curved surface from a perspective traversing the first optical fiber.

* * * * *